(12) United States Patent
Lips

(10) Patent No.: US 6,314,979 B1
(45) Date of Patent: Nov. 13, 2001

(54) LIQUID INJECTION APPARATUS AND METHOD FOR HORTICULTURAL WATERING SYSTEMS

(75) Inventor: Jon S. Lips, Parker, CO (US)

(73) Assignee: Fertigator, Inc., Parker, CO (US)

(*) Notice: Subject to any disclaimer, the term of this patent is extended or adjusted under 35 U.S.C. 154(b) by 0 days.

(21) Appl. No.: 09/405,870

(22) Filed: Sep. 24, 1999

Related U.S. Application Data

(60) Provisional application No. 60/124,501, filed on Mar. 16, 1999.

(51) Int. Cl.[7] .............................. B05B 7/28; F16K 11/00
(52) U.S. Cl. ........................ 137/3; 137/268; 137/624.2; 137/205.5; 239/310
(58) Field of Search ................. 137/624.2, 268, 137/246, 246.12, 205.5, 3; 239/69, 70, 1, 727, 310

(56) References Cited

U.S. PATENT DOCUMENTS

| | | | |
|---|---|---|---|
| 3,202,164 | * 8/1965 | Thompson et al. | 137/205.5 X |
| 3,669,357 | 6/1972 | Overbey | 239/310 |
| 4,026,673 | 5/1977 | Russo | 23/272 |
| 4,456,176 | 6/1984 | Agius | 239/142 |
| 4,529,001 | 7/1985 | Biancardi . | |
| 4,545,396 | 10/1985 | Miller et al. | 137/78.3 |
| 4,558,715 | 12/1985 | Walton et al. | 137/99 |
| 4,558,716 | 12/1985 | Muchow | 137/269 |
| 4,852,802 | 8/1989 | Iggulden et al. | 239/64 |
| 4,870,991 | 10/1989 | McMillan et al. | 137/624.12 |
| 4,895,303 | 1/1990 | Freyvogel | 239/61 |
| 4,917,304 | 4/1990 | Mazzei et al. | 239/64 |
| 4,995,418 | 2/1991 | Cervola | 137/268 |
| 5,022,585 | 6/1991 | Burgess | 239/70 |
| 5,213,694 | * 5/1993 | Craig | 137/101.27 X |
| 5,271,526 | 12/1993 | Williams . | |

* cited by examiner

Primary Examiner—Kevin Lee
(74) Attorney, Agent, or Firm—Marsh Fischmann & Breyfogle LLP

(57) ABSTRACT

An inventive apparatus and method is disclosed for the automatic injection of a liquid additive (e.g., liquid fertilizer, liquid herbicide, liquid pesticide, liquid fungicide, a wetting agent solution or a mixture thereof) into a horticultural liquid dispensation system (e.g., a conventional sprinkler system). The invention can be readily packaged/installed with conventional watering systems or readily implemented with existing, installed watering systems. In one arrangement, the invention includes a programmable controller and an injection assembly comprising at least one solenoid valve and an injector. The controller senses which of a plurality of watering zones is currently being watered, and effects the transmission of electrical pulses to the solenoid valve. Such pulses cause the valve to open/close and thereby produce stroking of a spring-loaded piston within the injector. As a result, a predetermined amount, or "slug", of liquid additive is injected into the watering system on each stroke. The pulse rate for each given watering zone may be set at the programmable controller by a user.

40 Claims, 4 Drawing Sheets

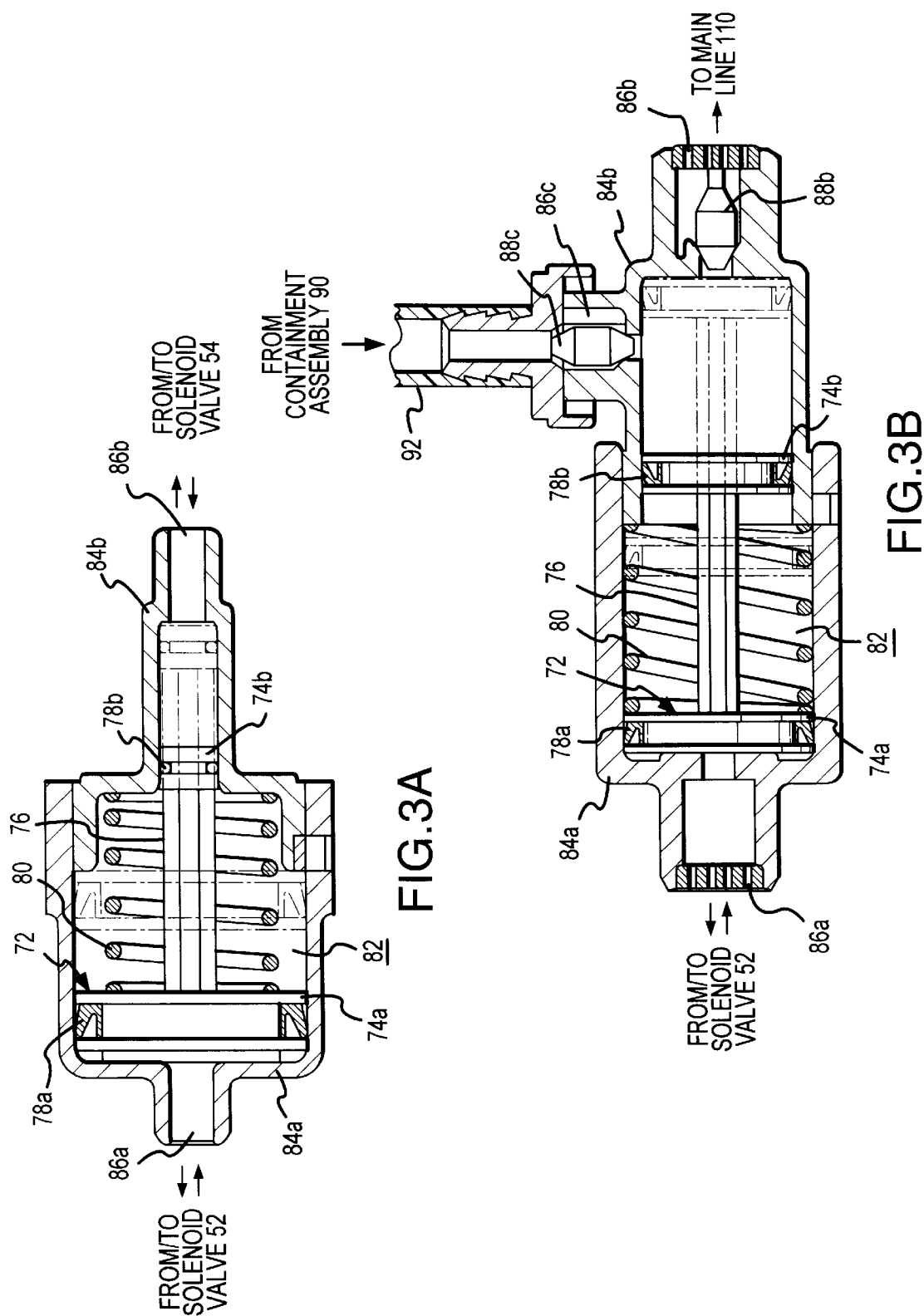

LIQUID INJECTION APPARATUS AND METHOD FOR HORTICULTURAL WATERING SYSTEMS

RELATED APPLICATIONS

This application claims priority under 35 U.S.C. §119 to prior U.S. Provisional Patent Application Ser. No. 60/124,501, filed Mar. 16, 1999, the entirety of which is hereby incorporated by reference.

FIELD OF THE INVENTION

The present invention relates to horticultural liquid dispensation systems, and more particularly to a method and apparatus for injecting a liquid additive into a horticultural watering system. The invention is particularly apt for the injection of a liquid fertilizer, herbicide, fungicide, pesticide and/or mixture thereof into a conventional sprinkler system.

BACKGROUND OF THE INVENTION

Various approaches have been proposed for the injection of liquid additives into horticultural watering systems. Of particular interest, liquid fertilizers have been injected into watering systems employed in the turf growth/maintenance industry for many years.

Known approaches for liquid fertilizer injection have included both powered and non-powered systems. By way of primary example, metering pumps have been utilized in connection with golf course watering systems around the world. Such systems have proven too expensive to implement in many applications, including for example residential sprinkler systems.

Proposed non-powered systems have included venturi-type injectors and flow-through injectors. The venturi-type injectors have had limited success due to unacceptable attendant pressure loss in the system. Flow-through injectors provide for the flow of water through a reservoir, or pot, charged with a liquid or water soluble, granulated fertilizer. Such systems generally require recharging of the reservoir upon each use. Further, the reliable obtainment of a desired fertilizer application rate has proven problematic.

More generally in the later regard, it has been recognized that the application of small dosages of fertilizer to turf or foliage over an extended time is preferable to a single high dosage application. Low dosages avoid extreme growth spurt/burning cycles, and otherwise enhance the establishment of desirable root structures. In turn, susceptibility to pest and weed infestation is significantly reduced.

SUMMARY OF THE INVENTION

In view of the foregoing, a primary objective of the present invention is to provide a liquid additive injection apparatus/method for horticultural liquid dispensation systems that may be produced and operated on a cost effective basis. In this regard, the present invention avoids the use of motor-driven metering pumps or the like, and is therefore practical for both residential and commercial usage.

A further principal object of the present invention is to provide a liquid additive injection apparatus/method that is easy to implement. In this regard, the present invention can be readily incorporated into new or pre-existing horticultural watering and other liquid dispensation systems.

An additional important object of the present invention is to provide a liquid additive injection apparatus/method that provides for the selective injection of liquid additives into a horticultural watering system at one or more selectively established rates, thereby enhancing the desired plant response.

In one aspect of the present invention, a liquid injection apparatus is provided that includes a first valve, fluidly interconnected to a horticultural liquid dispensation system (e.g. a sprinkler/drip watering system), for selectively passing pressurized liquid (e.g. water) from the system into an injector. In turn, the injector mechanically forces a liquid additive into the dispensation system in direct response to the pressurized liquid. The injector may be fluidly interconnected to the first valve so as to internally receive liquid from the liquid dispensation system. Similarly, the injector may be fluidly interconnectable to a liquid additive reservoir so as to internally receive the liquid additive.

In one arrangement, the injector includes a piston slideably disposed within an internal chamber to define a tandem cylinder having a first internal portion when the piston is in a first position and a second internal portion when the piston is in a second position. The pressurized liquid from the liquid dispensation system may be received in the first internal portion (i.e., when the piston is disposed in its first position) and the liquid additive may be received in the second portion (i.e., when the piston is in its second position). In the later regard, a resilient member (e.g., a coil spring) may be provided (e.g. within the injector) to urge or bias the piston into the second position.

As will be further described, upon "opening" the first valve the fluid pressure within the liquid dispensation system may be employed to force the piston into the first position and thereby push a "slug" of liquid additive out of the second internal portion of the injector, while also deflecting (e.g. compressing) the resilient member. When the first valve is "closed", the spring force of the deflected, or activated, resilient member may be employed to force the piston into its second position, thereby creating a vacuum within the second internal portion of the injector. Such vacuum may be utilized to draw or "suck" liquid additive into the injector for dispensation upon the next piston "stroke". In this manner, discrete liquid additive increments may be injected into the liquid dispensation system.

In order to provide for the effective receipt and dispensation of liquid additive from within the injector, the piston may include a seal member positioned about at least one end of the piston to slideably and sealably engage an internal wall within the injector. Most preferably, a first seal member is positioned about a first end of the piston to slideably and sealably engage a first internal wall portion and a second seal member is positioned about a second end of the piston to slideably and sealably engage a second internal wall portion.

In another aspect of the present invention, a liquid additive injection apparatus is provided for use with a liquid dispensation system (e.g. a sprinkler/drip watering system) that includes a main controller for transmitting signals to control the flow of water within the liquid dispensation system (e.g. control signals to solenoid valves). The inventive injection apparatus includes a first valve fluidly interconnectable to the liquid dispensation system and an injector fluidly interconnected to the first valve for injecting a liquid additive into the liquid dispensation system in response to the receipt of pressurized liquid from the system through the first valve. In the later regard, the first valve is provided to selectively pass the pressurized liquid to the injector in response to the sensed transmission of control signals by the main controller of the liquid dispensation system.

In conjunction with this inventive aspect, the control signals transmitted by the main controller may be electrical and the first valve may be electrically actuateable. Relatedly, the injection apparatus may include an injection controller, electrically interconnectable to the main controller and the first valve, for sensing the main controller control signals and for responsively transmitting electrical pulses to open/close the first valve. The injector dispenses a predetermined amount, or "slug", of liquid additive into the liquid dispensation system in response to each pulse received by the first valve (i.e. a single slug per open/close cycle).

In yet a further aspect of the present invention a liquid injection apparatus is provided for use with a liquid dispensation system that comprises a main controller for transmitting control signals to each of a plurality of different coverage zones to selectively effect liquid dispensation within each of the different coverage zones. The inventive apparatus provides for the injection of a liquid additive into the liquid dispensation system at a rate that is selectively pre-established on a coverage zone-specific basis. For example, when used with a conventional water sprinkler system, a liquid additive injection rate of x may be established for a first watering zone, a liquid additive injection rate of y may be established for a second watering zone, a liquid additive injection rate of z may be established for a third watering zone, and so on. In one arrangement, the selectable injection rates (e.g. x, y, z, etc.) may be defined as related multiples (e.g. y=2x, z=3x, etc.).

The selectable injection rate may be realized via the inclusion of an injection controller that is electrically interconnectable to the main controller of the liquid dispensation system so as to sense the transmission of control signals by the main controller. More particularly, the injection controller may be interconnected in parallel with signal control lines that extend between the main controller and each of the coverage zones (e.g. each coverage zone may have a corresponding solenoid valve interconnected by a control signal line to the main controller). As such, the injection controller can electrically monitor which coverage zone is receiving a control signal to effect liquid dispensation. The injection controller may be pre-programmable to allow a user to establish a liquid additive injection rate dependent upon the given coverage zone within which liquid is being dispensed.

In one embodiment, the liquid additive injection rate may be effected by the transmission of electrical pulses by the injection controller to an electrically-actuateable valve, wherein each pulse will cause an inlet port of the valve to open at the beginning of the pulse and close at the end of the pulse. Each open/close cycle of the first valve will result in the injection of a predetermined amount, or "slug", of liquid additive into the liquid dispensation system. For such purposes, the valve may be interconnected to a tandem cylinder injector as described above. As will appreciated, upon closure of the inlet port of the valve (e.g. at the end of a pulse) the injector will be isolated from the liquid pressure within the liquid dispensation system.

In such an embodiment, a second electrically-actuateable valve may be fluidly interconnected at a first port to the injector and electrically interconnected in parallel with the first valve to the injection controller. The second valve may be further fluidly interconnected at a second port with a liquid additive reservoir and at a third port with the liquid dispensation system. Such connections may be established so that when an electrical pulse is received from the injection controller the third port of the second valve will open to allow the flow of liquid additive from the injector to the liquid dispensation system. Correspondingly, the second port will be closed. At the end of a given electrical pulse, the third port of second valve will close and the second port of the second valve will open to allow for the passage of liquid additive through the second valve and into the injector. Such an arrangement provides for effective isolation of the liquid additive within a reservoir.

At this point, it should be noted that various liquid additives may be injected by the present invention. By way of example, such liquid additives may include liquid herbicides, liquid pesticides, liquid fertilizers, liquid fungicides, solutions containing wetting agents and/or mixtures of any of the foregoing. A selected liquid additive may be readily employed by simply replacing the contents of the liquid reservoir interconnected with the present invention and/or by replacing the entire liquid additive reservoir with one containing the desired additive. In the later regard, the present invention accommodates interconnection/disconnection of disposable liquid additive reservoirs (e.g. off-the-shelf container).

In another aspect of the present invention, an inventive method is provided for injecting a liquid additive into a liquid dispensation system (e.g. a sprinkler/drip watering system). The inventive method includes drawing a liquid additive into an injector, and utilizing the liquid pressure within the liquid dispensation system to mechanically force the liquid additive from the injector into the liquid dispensation system. The drawing step may include the employment of a spring force (e.g. of a resilient member) to draw the liquid additive into the injector. In this regard, the method may further include the application of the liquid pressure within the liquid dispensation system to deflect the resilient member. In order to provide for the successive injection of incremental "slugs" of liquid additive, the drawing and liquid pressure utilization steps may be successively repeated. To effect such functionality, a piston within the injector may be reciprocated between first and second positions in response to the successive application of the system liquid pressure and a resilient member spring force. The reciprocation may be defined to occur at a predetermined rate that is automatically established by a programmable injection controller.

In this regard, and in a related aspect of the inventive method, the above-noted drawing and utilizing steps may be repeated at a predetermined rate in response to the transmission of control signals by a main controller comprising the liquid dispensation system. Such control signals are provided by the main controller (e.g. the solenoid valves) to cause the desired dispensation of liquid within the liquid dispensation system.

To provide the response functionality, the inventive method may include sensing of the control signals transmitted by the main controller, and transmitting activation pulses to at least a first valve in response thereto. A valve/injector arrangement may be utilized as discussed above. The activation pulses effect the initiation and termination of the above-noted step of utilizing pressure within the liquid dispensation system to force liquid additive from the injector.

In yet a further aspect of the present invention, an inventive method is provided for injecting a liquid additive into a liquid dispensation system that comprises a main controller for transmitting control signals to each of a plurality of different coverage zones (e.g. control signals that cause the solenoid valves corresponding with each coverage zone to selectively open/close). The inventive method provides for the separate establishment of a predetermined liquid additive injection rate for each of the plurality of coverage zones. Additionally, the method further includes the sensing of control signal transmission by the main controller on a coverage zone-specific basis, and the injection of a liquid additive at a predetermined rate corresponding with the coverage zone within which liquid is being dispensed at a given time. To effect liquid additive injection, the method may include the transmitting of electrical pulses to a first electrically-actuateable valve, wherein the valve passes pressurized liquid from the liquid dispensation system in response to each of the electrical pulses. Correspondingly, the pressurized liquid may be received within an injector to mechanically force a liquid additive into the liquid dispensation system. The method further provides for the drawing of the liquid additive into the injector between each of the electrical pulses. Such a drawing step may include the employment of a resilient member to draw the liquid additive into the injector.

The above-described aspects of the present invention provide numerous advantages. In particular, the invention provides for the incremental dispensation of a selected liquid additive into a liquid dispensation system on a predetermined rate-of-application basis. Such dispensation allows for the uniform, precise and gradual treatment of foliage and turf, thereby enhancing the desired response.

Further in this regard, the present invention allows a selectable amount of liquid additive to be dispensed on a coverage zone-specific basis. In this manner, the optimal application of liquid additives can be accomplished for the given type of foliage/turf present in each given coverage zone of a liquid dispensation system.

Additionally, the present invention accommodates the dispensation of various different types of liquid additives. For example, liquid herbicides, fungicides, pesticides and fertilizers may be employed with simple change-out procedures. Further, the application rate for any given liquid additive may be easily set by the user. As such, the user may optimally control the application of liquid additives to address particular horticultural growth needs, pest or weed problems, time-of-year considerations, etc.

In addition to the foregoing, the present invention may be efficiently produced and operated. Finally, the invention may be readily installed and is extremely user-friendly.

Additional advantages and aspects of the present invention will be apparent to the skilled in the art upon consideration of the further description that follows.

BRIEF DESCRIPTION OF THE DRAWINGS

FIG. 3A and FIG. 3B illustrate alternate embodiments of injectors employable in the present invention.

DETAILED DESCRIPTION OF THE PREFERRED EMBODIMENT

Figure 1:
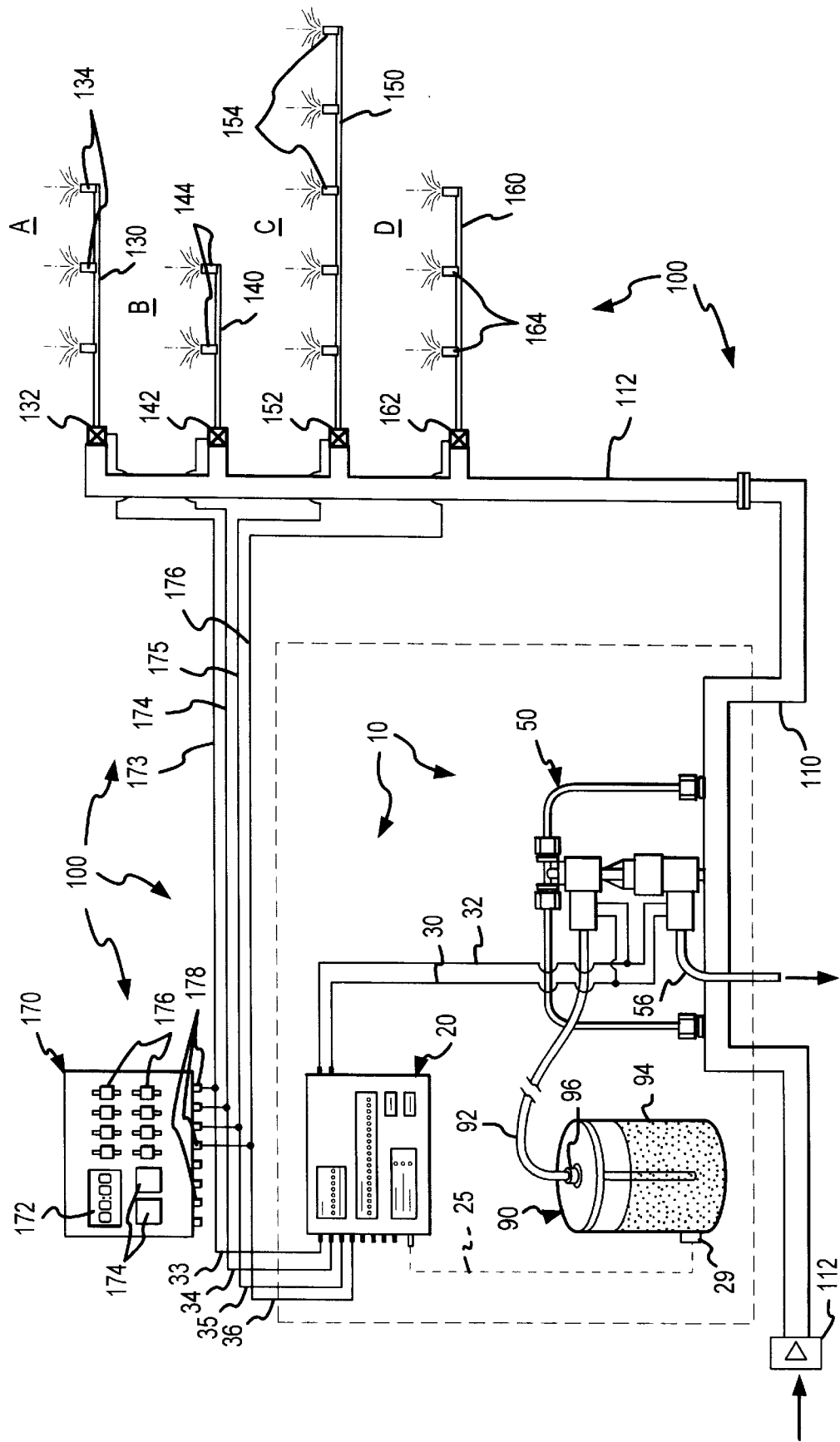
FIG. 1 illustrates one embodiment of the present invention as implemented with an exemplary conventional lawn sprinkler system.

FIG. 1 illustrates one embodiment 10 of the present invention as implemented with an exemplary conventional lawn sprinkler system 100. As will become apparent, the described embodiment 10 may be packaged and installed with a conventional system 100 or may be readily implemented to interface with a previously installed conventional system 100. Further, the described embodiment 10 comprises features that may be readily adapted for use in connection with liquid dispensation systems other than the illustrated exemplary system 100. For example, the present invention may be utilized in connection with hydroponic growth systems and tank-fed, sprayer systems.

In the exemplary watering system 100, a main watering system line 110 is fluidly interconnected to a main water supply (e.g. a city water supply or pump supply line) via valve 112, wherein water within the main water line 110 is "pressurized". Pressurization within the main water line 110 may also be provided via one or more dedicated pumps for the watering system. The main water line 110 is fluidly interconnected by a manifold 112 to a series of watering zone feed lines 130, 140, 150 and 160, via corresponding solenoid valves 132, 142, 152 and 162, respectively. Each of the zone feed lines 130, 140, 150 and 160 supply one or more corresponding water emitters (e.g. spray heads, drip heads, etc.) 134, 144, 154 and 164, respectively. The selective actuation, or opening/closing, of solenoid valves 132, 142, 152 and 162 may be effected via the transmission of electrical control signals by a main controller 170 through corresponding control signal lines 173, 174, 175 and 176, so as to effect the desired watering of corresponding watering zones A, B, C and D, respectively.

In the exemplary watering system 100, controller 170 includes a control clock 172, programming input keys 174, and duration-setting controls 176. The programming input keys 174 and duration-setting controls 176 may be utilized to establish one or more desired start time(s) for the watering system and the desired length of each watering period for each of the watering zones A–D serviced by corresponding solenoid valves 132, 142, 152 and 162, respectively. While the programmable controller 170 shown in FIG. 1 includes eight durational control knobs 176, and corresponding control signal line output ports 178 (e.g. to service up to eight corresponding watering zones), controller 170 may be provided with more/less zone control knobs/output ports. Similarly, while FIG. 1 shows an exemplary watering system 100 servicing four watering zones A–D, more/less zones may be readily defined in corresponding relation to the number of zone watering controls provided by a given controller 170.

Most typically, the control clock 172 of controller 170 will be set in accordance with real clock time and program input keys 174 will be utilized to establish one or more set times to initiate automatic operation of the system. Upon initiation of a watering cycle, controller 170 may be programmed to automatically transmit control signals through control lines 173, 174, 175 and 176 in a successive manner, wherein valve 132 stays open for a durational period set by the corresponding control 176 for zone A, then valve 132 closes and valve 142 is opened for a durational period set via the corresponding control 176 for zone B, and so on. Numerous additional features and configurations of exemplary watering system 100 will be known to those skilled in the art and are employable with the present invention, including the described embodiment 10.

In the later regard, the invention embodiment 10 shown in FIG. 1 includes a programmable injection controller 20, injection assembly 50, and liquid additive containment assembly 90. Injection assembly 50 is fluidly interconnected to the main watering system line 110 as well as the liquid additive containment assembly 90. Further, injection assembly 50, is electrically interconnected to injection controller 20 via injection signal circuit lines 30 and 32. In turn, injection controller 20 is electrically interconnected to the main watering system controller 170 via signal sensing lines 33, 34, 35 and 36. More particularly, signal sensing lines 33, 34, 35 and 36 are interconnected in parallel to control signal lines 173, 174, 175 and 176, respectively. As will be further described, injection assembly 50 operates to successively draw a predetermined amount, or "slug", of liquid additive from containment assembly 90 and inject such "slugs" into the main water line 110 of exemplary watering system 100 in response to electrical pulses received via injection signal circuit lines 30 and 32 from injection controller 20. The injection pulses are transmitted by injection controller 20 at a predetermined rate that is selectable by a user on a watering zone-specific basis, in response to sense signals received from the controller 170 via the parallel interconnections between the sensing signal lines 33–36 and corresponding control signal lines 173–176.

Figure 2A:
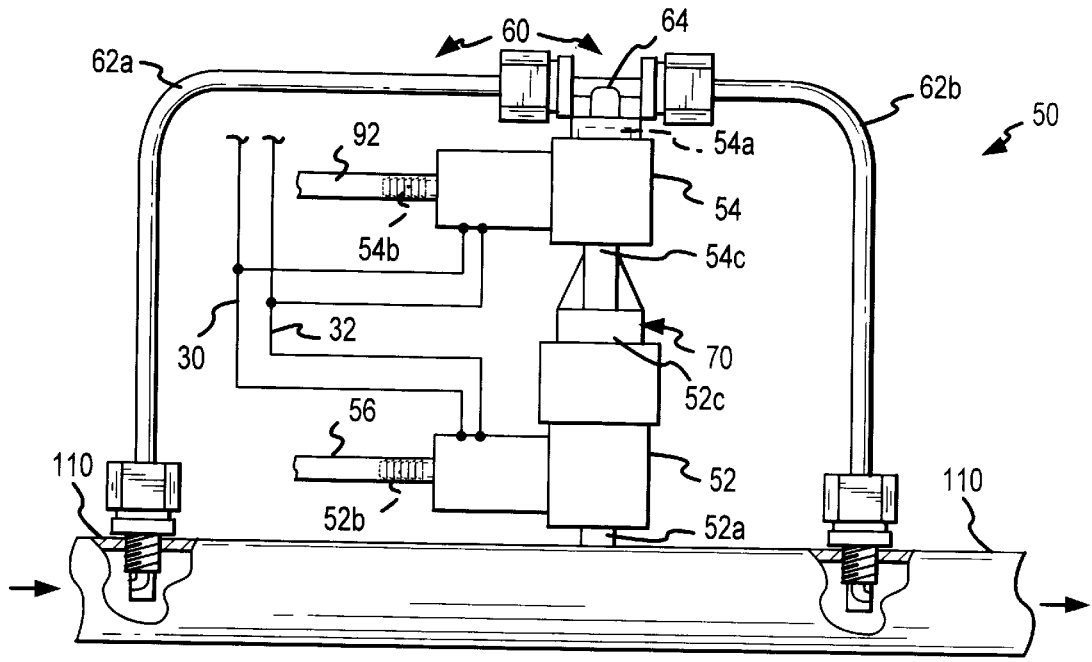
FIG. 2A and FIG. 2B illustrate alternate embodiments of injection assemblies employable in the present invention.
Figure 2B:
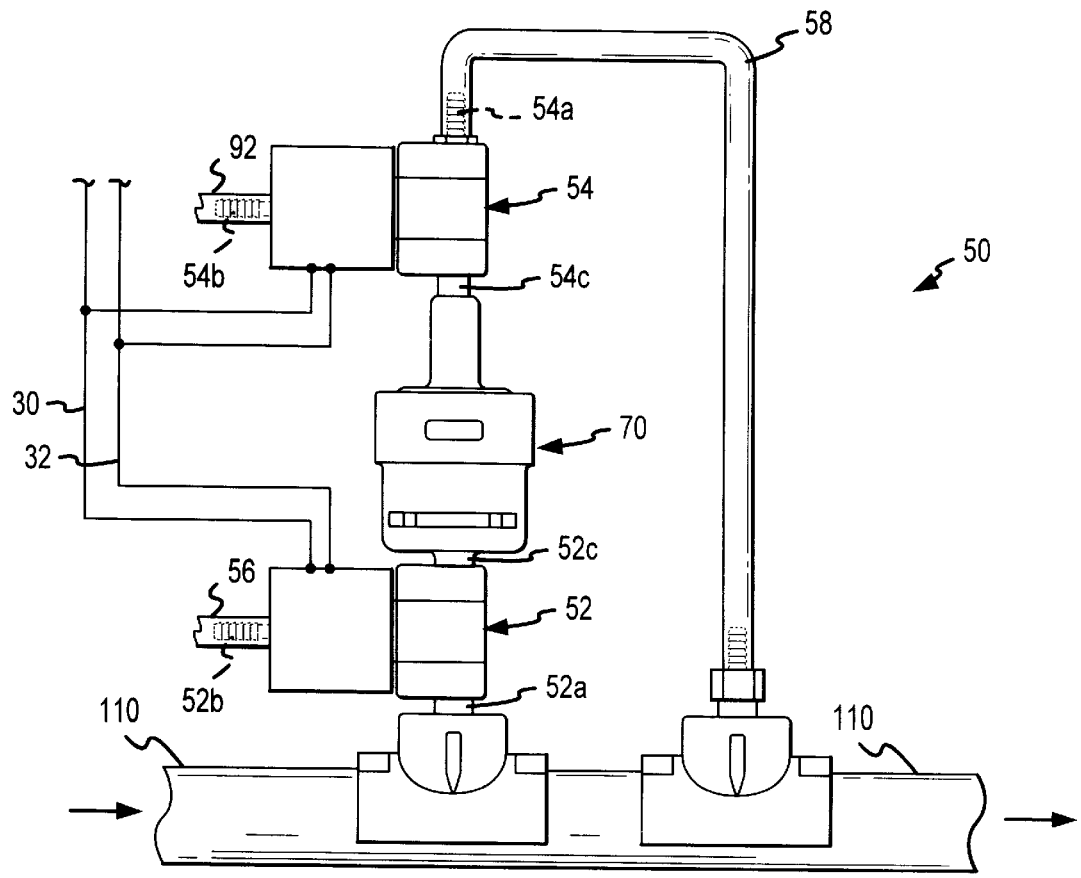

Referring now to FIG. 2A and FIG. 2B two alternative embodiments of injection assembly 50 are illustrated. Both embodiments include a first three-way solenoid valve 52 fluidly interconnected upon installation to the main water line 110 (e.g. via standard threadable and/or saddle fittings or the like), an injector 70 fluidly interconnected to the first solenoid valve 52, and a second three-way solenoid valve 4 fluidly interconnected to both the injector 70 and to the liquid additive containment assembly 90 (e.g., via a feed line 92). The first and second solenoid valves 52 and 54 are electrically interconnected in parallel via injection signal circuit lines 30 and 32 to the injection controller 20, wherein injection controller 20 selectively transmits signal pulses through injection signal circuit lines 30 and 32 to energize/de-energize and thereby simultaneously open/close the first and second solenoid valves 52 and 54. In the later regard, when first and second valves 52 and 54 are energized, or "opened", corresponding ports 52a and 54a are opened, and corresponding ports 52b and 54b are closed. When first and second valves are de-energized, or "closed", corresponding ports 52a and 54a are closed, and corresponding ports 52b and 54b are open. Ports 52c and 54c of valves 52 and 54, respectively, remain open at all times.

In operation, when the first solenoid valve 52 is energized, pressurized water within the main water line 110 flows through the first solenoid valve 52 and enters a first end of an internal chamber within injector 70. The pressure of the water entering the first end of the chamber of injector 70 acts upon a spring-loaded piston comprising injector 70 (described hereinbelow) to move the piston from a first position to a second position and mechanically force a predetermined quantity, or "slug", of liquid additive from a second end of the internal chamber. Synchronously, as the second solenoid valve 54 is energized the displaced liquid additive from injector 70 passes through the second valve 54 for injection into the main water line 110.

When valves 52 and 54 are de-energized, port 52a of valve 52 is closed and injector 70 is isolated from the pressurized water within main line 110. As such, the spring-loaded piston within injector 70 will return to its first position, thereby drawing or sucking via vacuum response, another "slug" of liquid additive from the containment assembly through feed line 92 and second valve 54 into the second end of injector 70. At the same time, a small quantity of water (i.e. that previously entered the first end of injector 70 when first valve 52 was energized) will be forced out of injector 70, into first valve 52, and exhausted to a drain line 56 via port 52b. Drainline 56 may be disposed to simply outlet the water to the ground.

As shown in the FIG. 2A and FIG. 2B embodiments, the primary difference therebetween is that the liquid additive exiting the second solenoid valve 54 in the FIG. 2A embodiment enters a sidestream assembly 60 fluidly interconnected at both ends to main line 110, while the liquid additive exiting the second solenoid valve 54 in the FIG. 2B embodiment is passed via a return conduit line 58 back to the main water line 110. The sidestream assembly 60 of the FIG. 2A embodiment is fluidly interconnected via first and second conduit lines 62a and 62b to the main water line 110, with a T-interconnection 64 to second valve 54 interposed therebetween. Sidestream assembly 60 provides for the flow of water from main line 110 therethrough, thereby facilitating selfpriming of the injection assembly 50. In this regard, the described arrangement provides for the removal of any air exiting second valve 54 (e.g., air drawn into the second valve 54 from the containment assembly 90) away from the injection assembly 50. In another installation arrangement, self-priming may also be facilitated by interconnection of the injection assembly 50 (e.g., either of the FIG. 2A or 2B embodiments) physically below the main water line 10. In this regard, the FIG. 2B embodiment injection assembly 50 may be readily modified to "reverse" the flow path orientation relative to main water line 110. In particular, first valve 52, injector 70, and second valve 54 may be interconnected between main line 110 and conduit 58 wherein water flows through conduit 58 to first valve 52 and injector 70 injects a liquid additive directly into main line 110 from outlet port 54a of second valve 54.

Turning now to FIG. 3A and FIG. 3B, two alternative embodiments of injector 70 will be described. The embodiment of FIG. 3A is employable in the injection assembly 50 embodiments of FIGS. 2A and 2B. The embodiment of FIG. 3B is employable in arrangements where a second solenoid valve 54 is not employed, as will be described.

Each of the FIG. 3A and FIG. 3B embodiments define a tandem cylinder arrangement. In particular, each of the embodiments include a piston 72 comprising a first enlarged end 74a and an opposing second enlarged end 74b interconnected by a shaft member 76. The enlarged ends 74a and 74b may each be of a spool-shaped configuration. Seal members 78a and 78b (e.g. a resilient, v-shaped packing ring or o-ring) are positioned about the first and second enlarged ends 74a and 74b, respectively, in the spool-seats thereof. A coil spring 80 is positioned about the shaft member 76 of piston 72 and is disposed within the injector 70 so as to act upon the first enlarged end 74a.

As shown in FIG. 3A and FIG. 3B, piston 72 is positioned within an internal chamber 82 of injector 70 that is defined by opposing injector housing members 84a and 84b. More particularly, the first enlarged end 74a of piston 72 is sized to fit within a first portion of chamber 82, wherein seal member 78a slidably and sealably engages an internal wall of the first housing member 84a. Similarly, the second enlarged end 74b of piston 72 is sized to fit within a second portion of chamber 82, wherein seal member 78b sealably and slidably engages an internal wall of the second housing member 84b.

In the embodiments shown by FIG. 3A and FIG. 3B, one end of the coil spring 80 is seated, or captured, between the first enlarged end 74a of the piston 72 and an end portion of the second housing member 84b. As such, movement of the piston 72 away from fluid port 86a of the injector 70 will cause spring 80 to compress and apply a spring force to the first enlarged end 74a.

In operation of the FIG. 3A injector 70, when first and second valves 52 and 54 are energized, or opened (e.g. via the receipt of a pulse from injection controller 20), water is received in a first portion of chamber 82 through port 86a.

Concomitantly, the pressure of the water within the main line 110 acts upon the first enlarged end 74a of piston 72 so as to displace the piston 72 from a first position to a second position (e.g. so as to move the piston 72 from left to right as shown by the phantom lines in FIG. 3A). Such displacement causes first enlarged end 74a to compress the coil spring 80 and second enlarged end 74b to force liquid additive present within a second portion of chamber 82 out through port 86b and through second valve 54. In this regard, it should be apparent that the spring force of coil spring 80 should be less than the pressure within main waterline 110 during a watering cycle. By way of example, for watering systems having a minimum water pressure of about 30 psi, coil spring 80 may be selected to provide a spring force of about 25 psi. When first and second valves 52 and 54 are deenergized, or closed (e.g. when no pulse is being received from injection controller 20), injector 70 is isolated from the water pressure within main line 110. As such, the compressed coil spring 70 acts upon the first enlarged end 79a of piston 72 so as to return piston 72 to its first position. Correspondingly, a vacuum is created in the second portion of chamber 82 so as to drain, or suck, liquid additive from containment assembly 90 through the second valve 54 and into the second portion of chamber 82 inside injector 70. As will be appreciated, the successive pulsing of first and second valves 52 and 54 by injection controller 20 effectively provides for the "stroking" of piston 72 within injector 70 so as to dispense successive "slugs" of the liquid additive.

Operation of the FIG. 3B injector 70 is similar. However, as noted above, a second solenoid valve 52 is not employed with this embodiment. Rather, the second injector housing member 84b may be provided with an additional port 86c, and ports 86b and 86c may be configured to define one-way flow valves with corresponding valve members 88b and 88c. As shown in FIG. 3B, valve member 88b may be provided so as to allow for the flow of liquid additive from the second portion of chamber 82 through port 86b when the first valve 52 is energized, and to restrict fluid flow through port 86b into chamber 82 when first valve 82 is de-energized. Conversely, valve member 88c may be provided to restrict fluid flow from the second portion of chamber 82 through port 86c (e.g., when first valve 52 is energized), but to permit the flow of liquid additive from containment assembly 90 through port 86c and into the second portion of chamber 82.

The above-described injector 70 embodiments of FIGS. 3A and 3B provide for the effective isolation of liquid additive containment assembly 90. For example, in the event of a power failure, valves 52 and 54 will be automatically closed, thereby isolating the containment assembly 90. Further, in the event of a pressure loss in the main watering line 10 (e.g. due to line breakage) injector 70 may also serve to isolate the containment assembly 90 (e.g. when there is insufficient system pressure to cause piston 72 stroking within injector 70.

Figure 4:
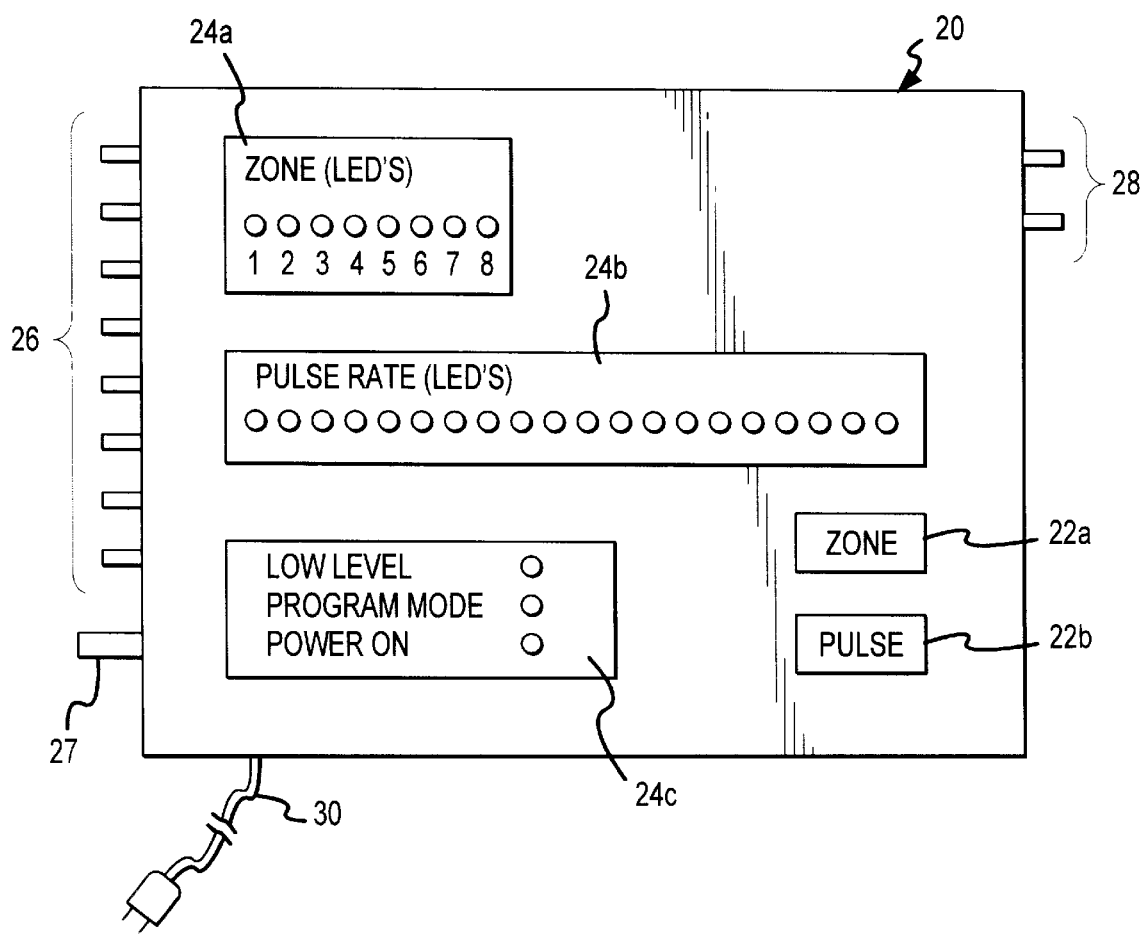
FIG. 4 illustrates an embodiment of an injection controller employable in the present invention.

As previously noted, injection controller 20 may be provided so as to allow a user to select a desired liquid additive injection rate on a watering zone-specific basis. FIG. 4 illustrates one programmable embodiment in which controller 20 comprises programming control keys 22a and 22b, and three LED display panels 24a, 24b and 24c. The programming control keys 22a and 22b may be utilized to selectively establish a desired "unit time" and to selectively establish the desired number of pulses per unit time to be transmitted by the injection controller 20 to the injection assembly 50. Each pulse transmitted by the controller 20 will effect the dispensation of a single "slug" of liquid additive from the injection assembly 50 into the main watering system line 110 for application to the given watering zone (e.g., one of zones A–D in the exemplary system 100) being watered at the a particular point in time. The description that follows represents one approach for programming controller 20. Numerous alternatives will be apparent to those skilled in the art.

In the embodiment of FIG. 4, a user may establish a desired "unit time" and/or pulse rate/unit time for a given watering zone by entering a "PROGRAM MODE." This may be accomplished via depression of the "ZONE" key 22a and "PULSE" key 22b simultaneously. For example, when the time keys 22a and 22b are depressed for greater than a first predetermined duration (e.g. 10 seconds) the "PROGRAM MODE" LED in display panel 24c will illuminate and an LED in the display panel 24a will illuminate to indicate the currently programmed "unit time" (e.g. wherein the "2" LED corresponds with a 2 minute unit time). To change the unit time, the "ZONE" key 22a may be depressed to increment the programmed unit time as desired, with the programmed value being indicated by the illuminated LED in display panel 24a. To end "unit time" programming, the "ZONE" and "PULSE" keys 22a and 22b may be depressed simultaneously. To establish the desired pulse rate/unit time, a user may again enter the "PROGRAM MODE" by depressing keys 22a and 22b simultaneously for a second predetermined duration (e.g. less than the first predetermined duration noted above). Again, upon entering the "PROGRAM MODE" the LED adjacent to "PROGRAM MODE" in the display panel 24c will illuminate. Additionally, the LED corresponding with "ZONE 1" in the first LED display panel 24a will illuminate. Correspondingly, the LED corresponding with the "PULSE RATE" currently programmed for the given "ZONE 1" will illuminate in the second LED display panel 24b. To change the pulse rate for "ZONE 1", a user may simply depress the "PULSE" key 22b to increment the pulse rate value by one, up to a maximum rate (e.g., to correspond with the number of LEDs shown in the display panel 24b). If the "PULSE" key 22b is depressed again after the maximum rate is reached, the set/displayed rate will return to the minimum (e.g., "0" pulses/unit time). To change the zone being programmed, a user may simply depress the "ZONE" key 22a until the desired zone is indicated by the corresponding LED in display panel 24a. Programming of the desired pulse rate can then be accomplished for the selected zone in the manner aforesaid. To exit the "PROGRAM MODE" again, both the "ZONE" key 22a and "PULSE" key 22b may be depressed simultaneously.

As previously noted, injection controller 20 may be provided for ready electrical interconnection with a main water system controller 110 and injection assembly 50. For such purposes, electrical ports 26 are provided for interconnection with signal lines 33–36, and electrical ports 28 are provided for interconnection with injection control circuit lines 30 and 32. In this regard, injection controller 20 is provided so that, when a given watering system valve 132, 142, 152 and 162 is actuated for watering a given corresponding zone A, B, C or D, respectively, the corresponding control signal carried by control signal line 173, 174, 175 and 176, respectively, will be sensed by the corresponding parallel sense signal line 33, 34, 35 or 36, respectively, and the sensed signal will be provided to the appropriate one of ports 26 of injection controller 20 that corresponds with the given watering zone A–D. In turn, controller 20 will transmit energizing pulses from electrical ports 28 to injection assembly 50 via injection control circuit lines 30 and 32. As noted, the pulse rate for a given watering zone may be selectively established at injection controller 20 via use of the programming control keys 22a and 22b. Such pulse rate will be applied for a given watering zone as long as control signals from main controller 110 to the corresponding zone solenoid (e.g. 132, 142, 152 or 162) are sensed by injection controller 20.

With further respect to injection controller 20, it is noted that the controller 20 may comprise or be interconnected with a transformer (e.g., to provide a 24V AC output) so as to permit direct powering of the injection controller 20 via a plug in cord 30. Further, a separate electrical port 27 may be provided at injection controller 20 for optional electrical interconnection with a level sensor 29 interconnectable or positionable adjacent to the containment assembly 90. For example, and as shown in FIG. 1, a level sensor 29 (e.g., an optical, ultrasound, or electric sensor) may be interconnected via an electrical circuit line 25 to port 27 of the controller 20 to detect when the liquid level in containment assembly 90 has reached a predetermined low level. Upon detection of a low liquid level, controller 20 may be provided so that a "LOW LEVEL" LED in display region 24c blinks on/off. Further, in some arrangements, controller 20 may be programmed so that upon detection of a low liquid level controller 20 will not send activation pulses to valves 52 and 54.

As will be appreciated, the above-described functionalities of injection controller may be readily provided by known microprocessor, memory (e.g. nonvolatile) and other electrical componentry. As such, implementation of the present invention may be accomplished in a variety of configurations. Further, the above-described functionalities of injection controller 20 may be integrated into a main controller 110 of a liquid dispensation system.

Installation/set-up of the embodiment 10 with exemplary watering system 100 will now be summarized. To establish fluid interconnection of the injection assembly 50 with the main watering system line 110, the water supply to the main watering system line 110 should be turned off (e.g. via closure of valve 112). Thereafter, when the FIG. 2a embodiment of injection assembly 50 is utilized, three holes may be drilled in the main watering system line 110 to accommodate fluid interconnection of the first valve 52 and the first and second conduit lines 62a and 62b. If the FIG. 2b embodiment of injection assembly 50 is utilized, only two holes need be drilled in the main line 110 to accommodate fluid interconnection of the first valve 52 and return conduit line 58. As previously noted, fluid interconnections between the fluid assembly and main line 110 may be readily established utilizing conventional fittings.

Injection controller 20 may be positioned as desired, preferably in adjacent relation to the main watering system controller 170 (e.g. within a garage or utility building). Electrical interconnection signal sensing lines 33, 34, 35 and 36 may then be readily interconnected between ports 178 of the main controller 170 and ports 26 of the injection controller 20. As will be appreciated, such interconnections should preferably be made when main controller 170 is not operational to effect watering. Injection signal circuit lines 30 and 32 may be preconnected and/or otherwise interconnected upon installation between ports 28 of injection controller 20 and first and second valves 52 and 54.

To complete the necessary fluid interconnections, liquid additive containment reservoir 90 is fluidly interconnected to the injection assembly 50. In this regard, liquid containment assembly 90 may include a replaceable or reusable reservoir 94 having a top port 96 (e.g. a pop-up spout) for selectively receiving the additive feed line 92 therethrough. The reservoir may be conveniently located a distance away from the injection assembly 50, wherein the additive feedline 92 provides the fluid interconnection therebetween. This facilitates the purchase/storage of larger quantities of additive by a user. Reservoir 94 may be of a hard plastic construction and may be partially light transmittent to allow for visual inspection of the volumetric content. After initial interconnection of feed line 92 to injection assembly 50 (e.g. interconnection to port 54b of the second valve 54 as noted above), feed line 92 may be readily inserted into the top port 96 of a given liquid reservoir 94 for usage. As will be appreciated, the terminal end of feed line 96 should be inserted sufficiently into reservoir 94 so as to be positioned near the bottom thereof. In the event the above-noted liquid level sensing option is provided, level sensing device 25 may also be interconnected to the reservoir 94 (e.g. via a clamp or sliding placement into a receiving groove formed within reservoir 94).

Upon providing power to the injection controller 20 (e.g. via plugging cord 30 into an outlet), a user may program injection controller 20 to provide the desired number of pulses per unit time for each given watering zone A–D in the manner noted above. The ability to program injection rates on a zone-by-zone basis provides a user with selective control over treatment so as to take into account the type and particular needs of the turf and/or foliage in each given zone. After programming, the embodiment 10 will automatically inject the desired liquid additive upon each watering cycle until reprogrammed, turned-off or until liquid reservoir 94 is depleted.

In this later regard, the described embodiment 10 readily accommodates replacement/refill of liquid additive reservoir 94 upon depletion and/or upon a determination that injection of a different liquid additive is desired. Such change/ servicing may be accomplished without a requirement to flush the injection system 50 or reprogram the injection controller 20. More particularly, to service/replace a liquid additive reservoir 94, feed line 92 may be withdrawn from the top port 96 of a given reservoir 94. Thereafter, the feed line 92 may be readily inserted back into the same reservoir 94 that has been refilled with the same and/or a different liquid additive, or alternatively, feed line 92 may be readily inserted into the top port 96 of a new reservoir 94 that comprises the same or a different liquid additive than that previously utilized. In the later regard, it should be appreciated that usage of off-the-shelf, disposable reservoirs 94 is particularly accommodated for enhanced ease-of-use. While not required, when a new or different liquid additive is employed, a user may easily modify the set injection rate via programing keys 22a, 22b on injection controller 20. In certain instances, it may also be desirable to cycle a small quantity of water from a reservoir 94 into injection assembly 50 when changing between certain liquid additives. Such practice maybe employed to establish a water "barrier" between two differing types of liquid additives that may otherwise yield a precipitate upon contact.

As previously noted, the present invention accommodates use of any number of different liquid additives in reservoir 94. By way of primary example, such liquid additives may include liquid fertilizers, liquid pesticides, liquid fungicides and liquid herbicides and/or mixtures thereof. Additionally, water-retentive particles, or wetting agents, may be mixed in solution in reservoir 94. With respect to fertilizers, it may be preferable to utilize organic-based liquid fertilizers (e.g. containing humate). Each of the various noted liquid additives may be provided in separate liquid reservoirs 94 and stored for periodic use. Further, with respect to each different type of liquid additive, corresponding predetermined instruction sets may be provided to facilitate programming of injection controller 20 so as to establish optimal application rates for each given liquid additive. By way of example, a user may readily vary the type, concentration and rate of application of a given liquid fertilizer depending on the time of year and growth cycle desired. Further, a user may selectively address insect and/or pest problems. Such flexibility yields numerous additional advantages relative to known systems.

The above-described embodiments are in no way intended to limit the scope of the present invention. Numerous extensions and adaptations of the invention will be apparent to those skilled in the art. For example, the present invention may be readily adapted for use with boom sprayer and/or skid mounted sprayer systems. In such systems, a tank containing a liquid is typically mounted on a powered vehicle and the liquid solution is pumped from the tank through a main flow line to a hand-held or pullalong, boom sprayer. To utilize the present invention, an injection assembly 50 may be fluidly interconnected to the main flow line between the tank and the sprayer, downstream of the pump. A containment assembly 90 may then be fluidly interconnected to the injection assembly 50. Finally, an interconnected injection controller 20 may be preprogrammed and/or otherwise adapted to provide pulsing at a preprogrammed injection rate (e.g. whenever liquid is being dispensed by the corresponding sprayer). In this application, the present invention provides particular benefits relative to current systems since the liquid additive to be applied does not need to be premixed with water and contained in the tank. As such, tank contamination/cleaning can be avoided.

In other applications of the present invention, a plurality of injection assemblies 50 may be controlled/activated by a single injection controller 20 via the use of one or more relays electrically interconnected between injection controller 20 and the various injection assemblies 50. Further, in other applications, multiple injection controllers 20 can be unitized in conjunction with a main watering system controller 170. Conversely, a single injection controller 20 may be utilized to provide injection control in combination with a plurality of main controllers 170. As will be appreciated then, the present invention accommodates numerable permutations and provides wide design flexibility/adaptability for the designers of liquid dispensations systems.

What is claimed is:

1. An apparatus for injecting a liquid additive into a liquid dispensation system, comprising:
    a first valve, fluidly interconnectable to a liquid dispensation system, for selectively passing pressurized liquid from the a liquid dispensation system; and,
    an injector for injecting a liquid additive into a liquid dispensation system in response to passage of a pressurized liquid from a liquid dispensation system through the first valve, wherein said injector includes a piston for displacing a liquid additive into a liquid dispensation system in response to a pressurized liquid from a liquid dispensation system.

2. An apparatus as recited in claim 1, wherein said injector is fluidly interconnected to said first valve to internally receive pressurized liquid therefrom.

3. An apparatus as recited in claim 1, wherein said injector is fluidly interconnectable to a liquid additive reservoir so as to internally receive liquid additive therefrom.

4. An apparatus as recited in claim 1, further comprising:
    a reservoir selectively interconnectable to said injector for containing a liquid additive.

5. An apparatus as recited in claim 3, wherein said liquid additive is selected from a group consisting of liquid fertilizer, liquid herbicide, liquid pesticide, liquid fungicide, a wetting agent solution and a mixture thereof.

6. An apparatus for injecting a liquid additive into a liquid dispensation system comprising:
    a first valve, fluidly interconnectable to a liquid dispensation system, for selectively passing pressurized liquid from a liquid dispensation system: and,
    an injector for mechanically forcing a liquid additive into a liquid dispensation system in response to passage of a pressurized liquid from a liquid dispensation system through the first valve, said injector comprising a piston slideably disposed within said injector to define a first internal portion in a first position and a second internal portion in a second position, wherein a pressurized liquid is receivable in the first internal portion and a liquid additive is receivable in the second portion.

7. An apparatus as recited in claim 6, said injector further comprising:
    a resilient member for applying a spring force to said piston.

8. An apparatus as recited in claim 7, wherein said resilient member is a coil spring.

9. An apparatus as recited in claim 7, said piston comprising:
    at least one seal member for slideably and sealably engaging an internal wall within the injector.

10. An apparatus as recited in claim 7, said piston comprising:
    a first seal member positioned about a first end of the piston for slideably and sealably engaging a first internal wall portion within the injector; and
    a second seal member positioned about a second end of the piston for slideably and sealably engaging a second internal wall portion within the injector.

11. An apparatus as recited in claim 10, wherein said resilient member is disposed to act upon one of said first and second ends of the piston.

12. An apparatus for injecting a liquid additive into a liquid dispensation system, wherein said liquid dispensation system includes a main controller for transmitting control signals to control the flow of pressurized liquid within said liquid dispensation system comprising:
    a first valve, fluidly interconnectable to a liquid dispensation system for selectively passing a pressurized liquid from a liquid dispensation system, wherein said first valve is operable to selectively pass a pressurized liquid therethrough in response to the transmission of control signals by a main controller; and,
    an injector for mechanically forcing a liquid additive into a liquid dispensation system in response to passage of a pressurized liquid from a liquid dispensation system through the first valve.

13. An apparatus as recited in claim 12, wherein said control signals are electrical, and wherein said first valve is electrically-activateable.

14. An apparatus as recited in claim 13, further comprising:
    an injection controller, electrically interconnected to said main controller and said first valve, for sensing said control signals and for responsively transmitting electrical pulses to said first valve, wherein said first valve selectively passes pressurized liquid and said injector injects liquid additive into the liquid dispensation system in response to each said pulse received by the first valve.

15. An apparatus as recited in claim 14, wherein said electrical pulses are transmittable at a predetermined rate selectable by a user.

16. An apparatus as recited in claim 15, wherein said liquid dispensation system is operable to dispense liquid to a plurality of different coverage zones and said control signals effect a desired dispensation of liquid to each of said plurality of zones, and wherein said injection controller is programmable to establish said predetermined rate on a zone-specific basis.

17. An apparatus as recited in claim 14, further comprising:
a second, electrically-activateable valve fluidly interconnected to said injector and fluidly interconnectable to a reservoir containing a liquid additive, wherein said second valve is electrically interconnected to said injection controller in parallel with said first valve to receive said electrical pulses.

18. An apparatus as recited in claim 17, wherein said second valve is operable to restrict passage of liquid additive from said reservoir to said injector when electrically activated, and operable to allow passage of liquid additive from the reservoir to the injector when deactivated.

19. An apparatus as recited in claim 18, wherein each of said first and second valves comprise a three-way solenoid valve.

20. An apparatus as recited in claim 19, further comprising:
a sidestream assembly fluidly interconnected at opposing ends to the liquid dispensation system and fluidly interconnectable to said second valve to receive liquid additive therefrom.

21. A method for injecting a liquid additive into a liquid dispensation system, comprising:
drawing a predetermined amount of a liquid additive into an injector by creating a vacuum therewithin;
utilizing water pressure within a liquid dispensation system to displace a liquid additive from said injector into a liquid dispensation system; and
successively repeating said drawing and utilizing steps in response to control signals.

22. A method as recited in claim 21, wherein said drawing step comprises:
employing a spring force of a resilient member to draw the liquid additive into the injector.

23. A method as recited in claim 22, further comprising:
applying said water pressure within the liquid dispensation system to deflect said resilient member.

24. A method as recited in claim 23, further comprising;
repeating said employing and applying steps successively.

25. A method as recited in claim 24, said repeating step comprising:
reciprocating a piston between first and second positions within said injector.

26. A method as recited in claim 21, wherein said successively repeating step occurs at a predetermined rate.

27. A method as recited in claim 26, further comprising:
automatically establishing said predetermined rate by an injection controller preprogrammed by a user.

28. A method as recited in claim 21, wherein said liquid dispensation system comprises a main controller for transmitting said control signals to control the flow of liquid within said liquid dispensation system, and wherein said successively repeating said successively repeating step occurs at a predetermined rate in response to the transmission of said control signals.

29. A method as recited in claim 28, further comprising:
sensing the transmission of said control signals.

30. A method as recited in claim 28, wherein said liquid dispensation system is operable to dispense liquid to a plurality of different coverage zones, and wherein said method further comprises:
establishing said predetermined rate on a coverage zone-specific basis.

31. A method as recited in claim 21, where said utilizing step comprises:
energizing an electrically-actuateable valve in response to said control signals to selectively pass pressurized liquid from said liquid dispensation system into said injector.

32. A method as recited in claim 31, further comprising:
utilizing a spring force to draw the liquid additive into the injector following said energizing step.

33. A method for injecting a liquid additive into a liquid dispensation system that comprises a main controller for transmitting control signals to control the flow of liquid to a plurality of different coverage zones within the liquid dispensation system, wherein the method comprises:
separately establishing a predetermined liquid additive injection rate for each of said plurality of coverage zones;
sensing transmission of said control signals to determine which of said plurality of coverage zones liquid is being dispensed within; and
injecting a liquid additive at a predetermined rate corresponding with the coverage zone within which liquid is being dispensed.

34. A method as recited in claim 33, wherein said injecting step comprises:
transmitting electrical pulses to a first electrically-actuateable valve, wherein said first electrically-actuateable valve passes pressurized liquid from said liquid dispensation system in response to each of said electrical pulses; and
receiving said pressurized liquid within an injector to mechanically force a liquid additive into the liquid dispensation system in response to the passage of pressurized liquid from the first electrically-actuated valve.

35. A method as recited in claim 34, further comprising:
drawing a liquid additive into said injector between each of said electrical pulses.

36. A method as recited in claim 35, wherein said drawing step comprises:
employing a spring force of a resilient member to draw the liquid additive into the injector.

37. An apparatus for injecting a liquid additive into a liquid dispensation system, comprising:
a first valve, fluidly interconnectable to a liquid dispensation system, for selectively passing a pressurized liquid from a liquid dispensation system in response to the receipt of control pulses; and
an injector for injecting a predetermined amount of liquid additive into a liquid dispensation system in response to passage of a pressurized liquid from a liquid dispensation system to the first valve in connection with each of said control pulses.

38. An apparatus as recited in claim 37, further comprising:
- an injection controller for transmitting said control pulses to said first valve, wherein said first valve selectively passes a pressurized liquid and said injector injects a liquid additive into a liquid dispensation system in response to each of said control pulses received by the first valve.

39. An apparatus as recited in claim 38, wherein said control pulses are transmittable at a predetermined rate selectable by a user.

40. An apparatus as recited in claim 37, wherein said injector includes a piston for displacing a liquid additive into a liquid dispensation system in response to a pressurized liquid from a liquid dispensation system.

* * * * *